Oct. 18, 1932.  H. ROSECRANTS  1,882,941
MUSIC BUILDER
Filed March 3, 1931  2 Sheets-Sheet 1
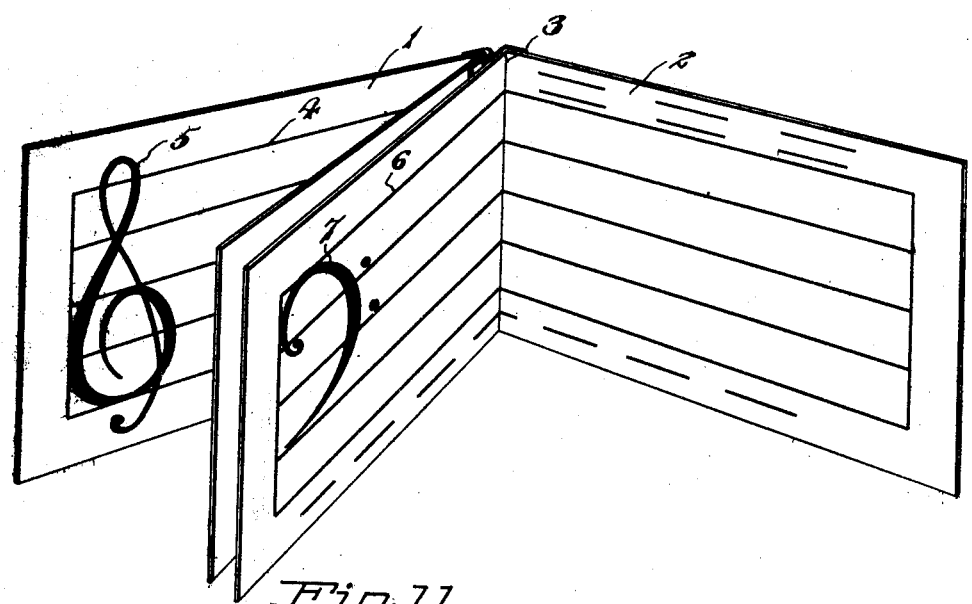
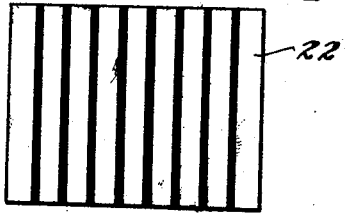
Inventor
Helene Rosecrants
By Lacey & Lacey, Attorneys Oct. 18, 1932.  H. ROSECRANTS  1,882,941
MUSIC BUILDER
Filed March 3, 1931   2 Sheets-Sheet 2
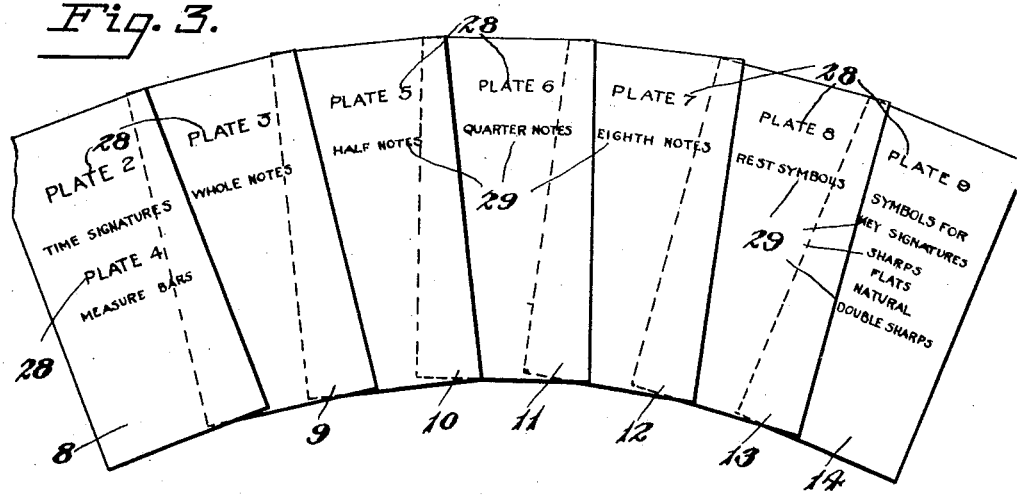
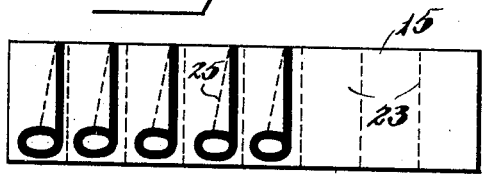 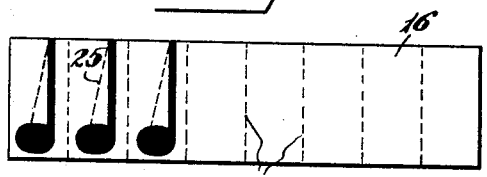
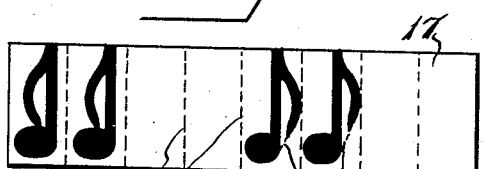 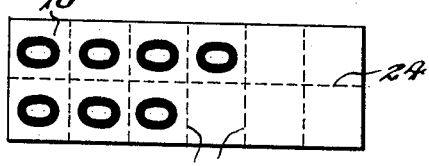
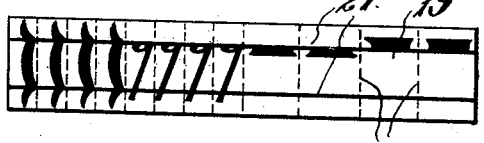 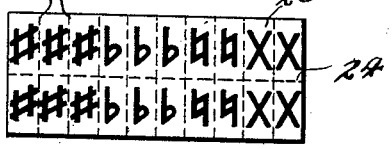
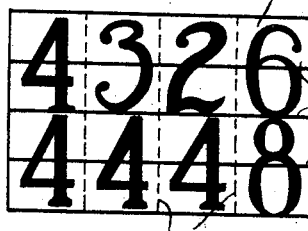
Inventor
Helene Rosecrants
By Lacey+Lacey,
Attorneys Patented Oct. 18, 1932

1,882,941

UNITED STATES PATENT OFFICE

HELENE ROSECRANTS, OF ST. JOSEPH, MICHIGAN

MUSIC BUILDER

Application filed March 3, 1931. Serial No. 519,889.

This invention relates to educational apparatus and more particularly to an apparatus by use of which music may be very easily taught to beginners and which may also be used by advanced students or composers.

One object of the invention is to provide apparatus of this character by the use of which beginners may be easily and quickly taught the rudiments of music and the names and uses of different notes and symbols used when composing music, and not only permit a small child to quickly learn the names and uses of the various notes and symbols, but also permit notes and symbols which are improperly placed upon a music staff to be easily removed and proper ones substituted.

Another object of the invention is to provide an apparatus of this character, one set of which may be supplied to each pupil so that the individual pupils each arrange notes and symbols upon staffs provided upon pages of a book forming part of the apparatus for correction by the instructor, thereby making it necessary for each pupil to do the work instead of watching the instructor or one pupil write the notes and symbols upon a score on a blackboard, or attempting to learn by means of a book of instructions having music scores printed upon its pages.

Another object of the invention is to provide an apparatus of this character wherein the pupils may be supplied with plates having music notes and symbols printed thereon which are to be cut from the plates as needed and envelopes marked to identify notes and symbols to be placed therein after they are removed from the staffs. By this arrangement the pupils become more familiar with the various notes and symbols and their uses and the notes and symbols will not be liable to be lost or mixed together when removed from the staffs as they will be placed in envelopes marked to identify the notes and symbols to be placed therein.

Another object of the invention is to provide an apparatus of this character by the use of which a musical composition may be easily composed by a beginner or an experienced composer and changes made if found necessary by merely shifting or substituting notes and symbols after which the composition may be copied into a permanent record book.

The invention is illustrated in the accompanying drawings, wherein:

Figure 1 is a view showing a number of notes and symbols set in place upon a staff having a treble clef.

Figure 2 is a perspective view of a pair of staff sheets bound together and partially opened.

Figure 3 is a group view of envelopes into which the notes and symbols are to be placed when removed from a staff, and Figures 4 through 11 disclose plates having various notes and symbols printed thereon and intended to be cut from the plates as needed and placed in the proper envelopes for future use after being removed from a staff.

The charts 1 and 2 forming part of the apparatus are preferably formed of stiff paper or thin cardboard, although any sheet material found suitable may be used. The sheets are folded intermediate their ends as shown at 3 and are reinforced in any suitable manner which will permit each sheet to be opened as shown in Figure 1 and remain in a flat condition.

Upon the sheet 1 is printed or otherwise marked a staff 4 having a treble clef 5 and upon the sheet 2 is a similar staff 6 having a bass clef 7. It will be understood that as many sheets as desired may be provided for disposition one above another when in use and also that the sheets may be of sufficient dimensions to have printed thereon a number of staffs, one above another and these staffs alternately provided with treble and bass clefs for use by advanced pupils or composers.

Accompanying each set of charts are a suitable number of envelopes designated respectively by the numbers 8, 9, 10, 11, 12, 13, and 14, shown in Figure 3, and a series of plates 15, 16, 17, 18, 19, 20, 21, and 22 upon which are printed music notes and symbols.

These plates are divided into sections by lines of scoring 23 extending transversely of the plates which may be dotted lines or scored lines which are impressed into the plates in order that the plates may be easily torn or cut when notes or symbols printed thereon are required. The plates 18 and 20 are further divided by lines 24 extending longitudinally thereof, and upon the plates 15 and 16 are provided lines 25 along which they are to be cut when the half notes and quarter notes printed thereon are cut out of the sections into which the plates 15 and 16 are divided by the lines 23. There may also be provided lines 26 extending from the stems of the one-eighth notes printed upon plate 17 to serve as guide lines when cutting out these notes. Upon the plates 19 and 21 are printed longitudinally extending lines 27 of the same distance apart as the longitudinally extending lines of the music staffs printed upon the sheets 1 and 2, thereby permitting the rest symbols printed upon the sections of the plate 19 and the time signatures printed upon the plate 21 to properly aline with the staff when set in place thereon as shown in Figure 1.

When this apparatus, which may be referred to as a music builder, is in use, each pupil of a class is supplied with a set of charts and an accompanying set of plates and envelopes. The instructor, after explaining the names and uses of the various notes and symbols may write a scale or simple musical composition upon a chart which may be seen by all of the pupils, and have the pupils reproduce the same upon their individual charts or merely state what notes and symbols are to be placed upon the charts by the pupils. The pupils cut the required notes and symbols from the plates as needed by means of scissors or a sharp knife and the cut out notes and symbols are set in place upon the charts as shown in Figure 1.

The envelopes are individually labeled to denote what plates are to be placed therein as shown at 28, and upon each envelope is printed the names of the notes and symbols to be placed therein as shown at 29. The plates may be similarly designated either upon their rear faces or upon their front faces, above or below portions having the notes or symbols printed thereon in order to identify companion plates and envelopes. This will greatly assist in teaching the names of the various notes and symbols as the companion plates and envelopes are identified and the envelopes bear the name of the notes or symbols to be placed therein. After the instructor has inspected the work done by each pupil, and corrections made by the pupils, if necessary, the notes and symbols which have been used may be removed from the charts and placed in their proper envelopes for future use, it being understood that the notes and symbols will be cut from the plates only as needed.

Before the notes and symbols are removed from the charts, the pupils copy the exercises into a permanent record book. It will thus be seen that it will not be necessary to erase from the record book as the exercise or composition will be correct and properly appear upon the chart before it is copied into the record book. Advance students and experienced composers may also use the apparatus for original compositions and copy them into a permanent book after the compositions have been tried and found satisfactory.

What is claimed is:

Apparatus for use in teaching and composing music comprising charts having staffs with clefs displayed thereon, and plates composed of separable sections, each section having a note or musical symbol displayed thereon whereby the notes and symbols may be separated for placement upon a staff, the sections displaying stemmed notes being each scored to form a brace connecting the stem and head of the note thereon and the sections bearing some symbols having lines across the same spaced according to the lines of a staff upon which they are to be placed.

In testimony whereof I affix my signature.

HELENE ROSECRANTS. [L. S.]